United States Patent
Korst et al.

(10) Patent No.: US 7,050,181 B2
(45) Date of Patent: May 23, 2006

(54) PRINTER APPLICATION ADAPTER SYSTEM

(75) Inventors: Roland F. A. M. Korst, HA Vlijmen (NL); Andreas A. M. van Swaaij, Druten (NL); Ronald R. Norton, Irvine, CA (US)

(73) Assignee: Printronix, Inc., Irvine, CA (US)

( * ) Notice: Subject to any disclaimer, the term of this patent is extended or adjusted under 35 U.S.C. 154(b) by 912 days.

(21) Appl. No.: 09/841,976

(22) Filed: Apr. 25, 2001

(65) Prior Publication Data

US 2002/0159085 A1    Oct. 31, 2002

(51) Int. Cl.
*G06F 15/00* (2006.01)

(52) U.S. Cl. .................................... 358/1.11; 358/1.15

(58) Field of Classification Search ................ 358/1.2, 358/1.8, 1.11, 1.15, 1.16, 1.17, 1.18, 1.12, 358/1.13, 1.14
See application file for complete search history.

(56) References Cited

U.S. PATENT DOCUMENTS

| | | | | |
|---|---|---|---|---|
| 5,167,013 A | * | 11/1992 | Hube et al. | 358/1.11 |
| 5,825,987 A | * | 10/1998 | Asada | 358/1.11 |
| 5,859,648 A | * | 1/1999 | Moore et al. | 345/471 |
| 6,323,865 B1 | * | 11/2001 | Colletti | 345/467 |
| 6,490,051 B1 | * | 12/2002 | Nguyen et al. | 358/1.15 |

* cited by examiner

*Primary Examiner*—Mark Wallerson
(74) *Attorney, Agent, or Firm*—MacPherson Kwok Chen & Heid LLP; Tom Chen

(57) ABSTRACT

A printer system for modifying the printer's output includes a program for the printer which is not compatible with the printer with a managing program for modifying the program. A substitution table substitutes a portion of the program that is not compatible and, a processor in the printer receives the substitution table and modifies the program. The system uses a method of printing with the non-compatible program by providing a program not compatible with the printer and then creating a character substitution table with characters compatible with the printer. The character substitution table is stored in the printer and the stored characters are adapted to the printer with the non-compatible program.

23 Claims, 6 Drawing Sheets

PRINTER APPLICATION ADAPTER SYSTEM

BACKGROUND OF THE INVENTION

1. Field of the Invention

The field of this invention resides within the printer art relating to printer controls and the use of certain programs. More specifically, it resides within the area of using a printer and adapting the printer to utilize a former program of a relatively non-compatible printer. The former program is modified and allowed to run the new printer or substitute printer in a suitable manner with incorporation of a prior system or program.

2. Background of the Invention and Prior Art

The prior art with regard to controlling printers such as line printers, thermal printers, and laser printers through a pre-established program is a relatively broad area. It incorporates numerous programmatic systems and concepts. Many printers are established with a particular program for utilization therewith. The program is specifically adapted to certain print functions and applications. These print functions and applications can be derived from a host computer, or within the printer itself.

Such host computer controls and related programs for the driving of a printer are well known in the art. These programs from the host computer are usually derived by a programmer to establish a printout of a particular type of print formation. This print formation can be related to bar codes, printing jobs with regard to invoices, reports, and multiple other functions that the host computer undertakes to control through its pre-established printing programs.

Such pre-established programs resident in the host computer or even in the printer can be associated with other computers for controlling printers. This can be combined on a network such as a network within a specifically hard wired internal or external system. It also applies to a network for controlling printers through the established internet functions and systems that can be placed on and off line to control remote printers and other equipment through a computer including a printer's host computer.

A major problem with many programs as established through prior programmatic efforts to control a printer is they are difficult to modify. This is due to the fact that oftentimes programmers use specific language and inputs that they are aware of and which are not commonly used in a broad program language spectrum. Although, the input functions of the programmer might be limited in scope, they can nevertheless cause a particular program for a particular printer to be generally printer specific.

It is difficult for a large organization having multiple printers that have been programmed with a multiplicity of different programs to change all the printer programs. This is true whether they be in the host or the printer itself or other computer or processor when establishing a new printing function or to adapt them to a new printer.

In order to remedy the problem, this invention utilizes a specific printer application adapter (PAA) through the system and/or software, or a particular printer. This is used in conjunction with a character substitution table (CST) which changes key characters or other elements of a particular program which must be adaptable to a particular printer or series of printers.

The invention hereof establishes a character substitution table (CST) for utilization with a printer application adapter (PAA) of this device. These can all be utilized with a program which manages the printer from a remote or proximate location.

The net result is to allow an older printer program for a printer to be incorporated with a new application, new printer, and/or a new output which is specifically adapted for such new applications.

Consequently, this invention is a step forward for adaptation of older programs for disparate printers for printing new printer outputs of various types through a prior existing program.

SUMMARY OF THE INVENTION

In summation, this invention incorporates a printer application adapter which modifies a former printer program through a character substitution table so that an output for the printer can be established with a modified prior program.

More specifically, the invention hereof provides for the ability to systematize or adapt old programs or other disparate programs for controlling new and other types of printers for various printing jobs. The function is provided through a printer manager managing system which creates a character substitution table for the specific characters of a prior program. These characters are then changed to effect the new printing output that is required.

A prior printing system or program is sent to a particular printer application adapter. This printer application adapter can be in the hardware or other process or capability of a printer. The printer application adapter receives the character substitution table that has been stored in non-volatile memory. It is then transmitted to the printer controller for controlling a specific output. The net result is a modified output from the original program evolving from the character substitution table that has been applied by the printer application adapter for the modified application.

DESCRIPTION OF THE PREFERRED EMBODIMENTS

In order to describe the printer system hereof, two examples of printers for which this invention can be utilized will be set forth.

Figure 1:
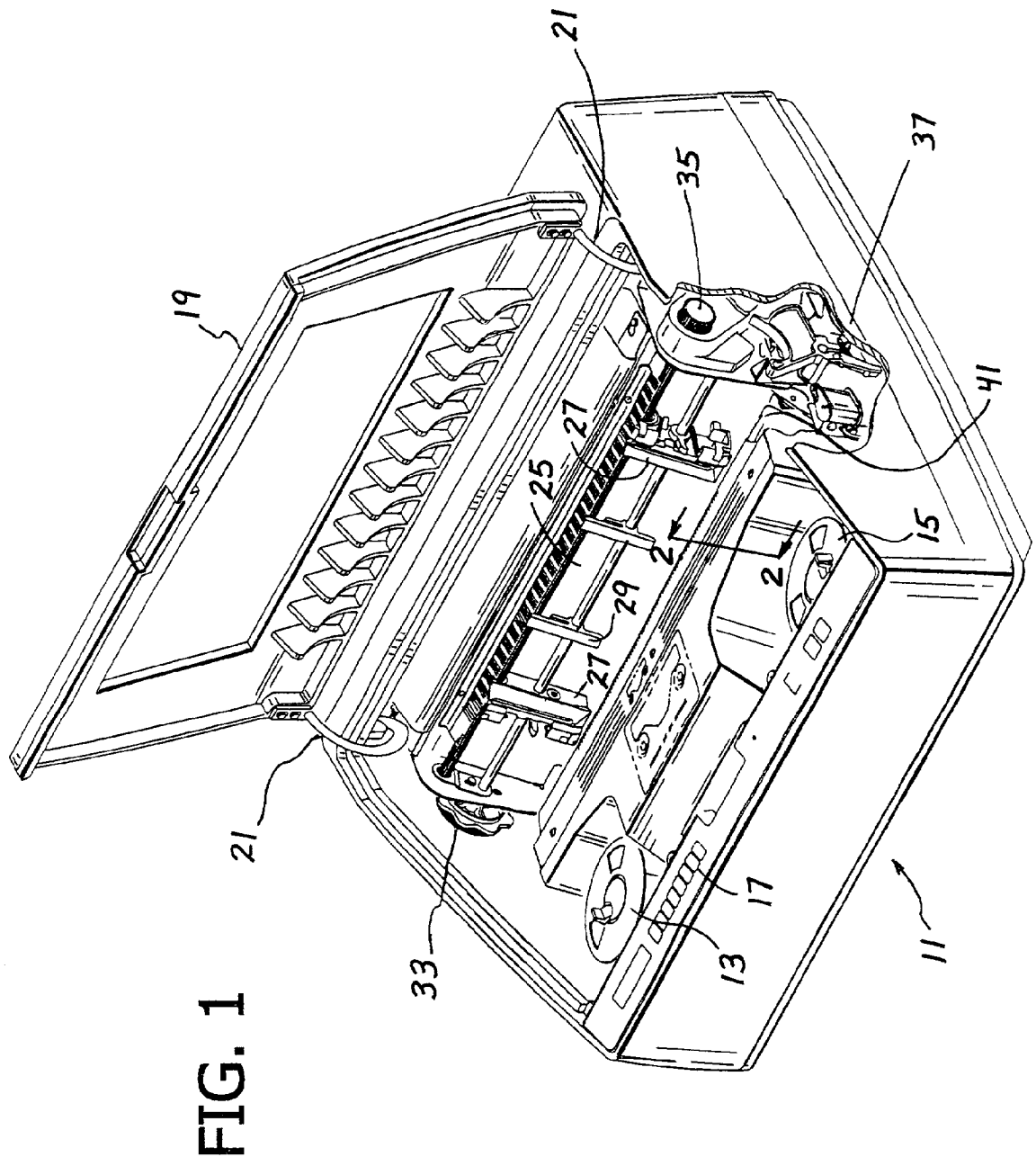
FIG. 1 shows a perspective view of a dot matrix line printer that can be used with this invention.
Figure 2:
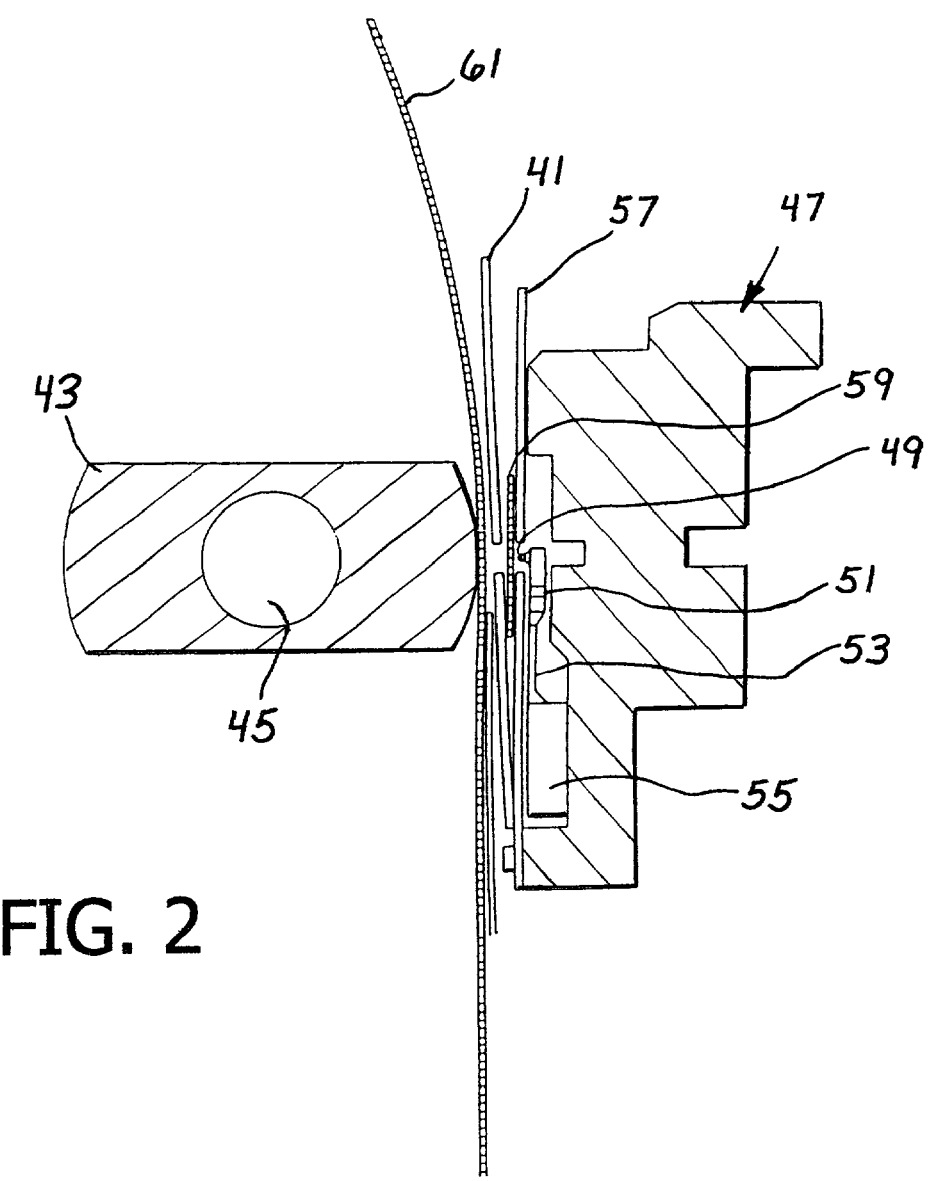
FIG. 2 shows a cross-sectional view of the hammerbank of the line printer shown in FIG. 1 along section lines 2—2 of FIG. 1.

The first example is in FIGS. 1 and 2 in which the aspects of a line printer which can be a line dot matrix printer or other type of dot matrix printer can be utilized. The line printer of FIG. 1 will be designated with odd numerals.

Looking more specifically at FIG. 1, the line printer 11 can be shown having reels 13 and 15 from which a ribbon is respectively unwound and wound for printing purposes. The line printer 11 in particular has a control panel 17 with a number of switches to input the various operator commands and programs from a menu or from any other control source in or out of the printer.

The printer 11 has a controller therein which is not seen but is a processor which can control the printer in the manner set forth hereinafter.

The printer 11 is formed with a case having a lid 19 hinged with brackets such as brackets 21 on either side.

A paper feeder in the form of a paper feeder 25 having tractors 27 on either side feeds paper across a paper support 29.

A horizontal adjustment knob 33 is shown with a vertical position knob 35 to orient the paper both horizontally and vertically.

The printer 11 incorporates a forms thickness lever 37 which can be opened and closed or moved to accommodate various thicknesses of forms or media that is to be printed upon.

Finally, a printer mask 41 is shown which masks the print ribbon from the media being printed upon as will be seen in the cross-section shown in FIG. 2.

The ribbon mask 41 as shown in FIG. 2 is in conjunction with a platen 43 which can be moved by its support 45.

A hammerbank 47 is shown having tips 49 connected to the ends of hammers 51 supported on a spring arm 53 that has been formed on a fret of hammers 55.

The hammerbank incorporates a hammerbank cover 57. A ribbon 59 is fed between the reels 13 and 15.

As is known in the art, the hammers 51 are released from a permanent magnet retention by electro-magnetic coils. The coils overcome the permanent magnetism for release of the hammer tips 49 in order to make an impact against paper 61. The paper 61 is fed through the space between the platen 43 and the tips 49 of the hammerbank.

The hammerbank 47 oscillates backwardly and forwardly for releasing the hammer tips 49 in a consistent manner for printing against the paper 61. In this manner, with the controller in the printer 11, printing can take place by the controller receiving signals from a host for the various printing functions that are to take place.

Figure 3:
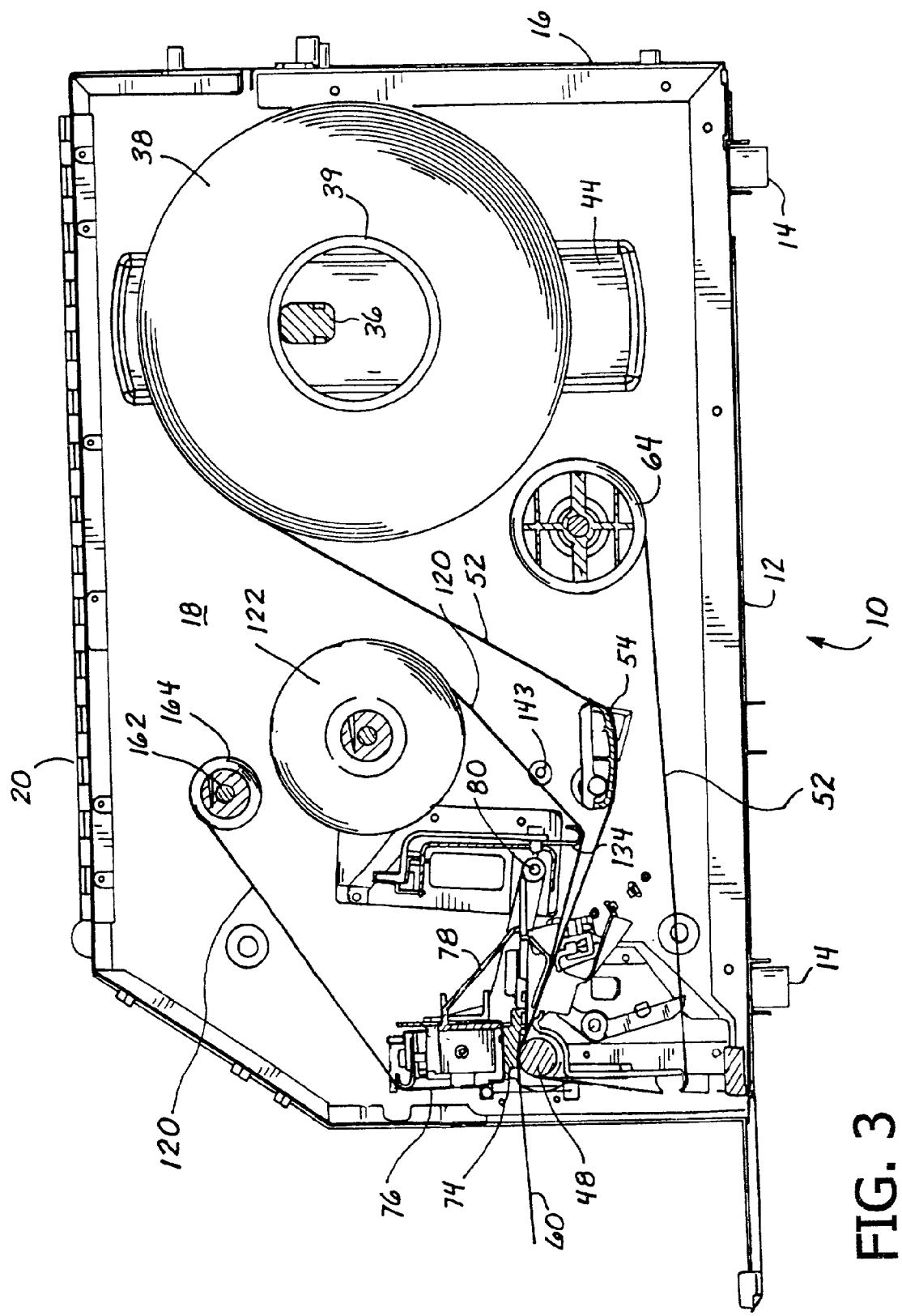
FIG. 3 shows a partially fragmented side elevation view of a thermal printer which can be used with this invention.

Looking at the apparatus of FIG. 3 it can be seen that a thermal printer 10 has been shown with a case constituting a base portion 12 having legs 14 upon which it stands. The base portion 12 forms the base for back wall 16 and cast drive support wall 18 that is in the form of a casting. The casing is covered by a hinged lid that is not shown but wherein the hinges 20 attached to the lid are shown.

In order to provide media to print on, a media support rod, bar or rack 36 has been provided to support a spool of media. The bar 36 is connected to the wall 18 in a rigid manner and is supported rigidly based upon the strength of the casting of the wall 18. A media roll or spool 38 is on the bar 36. The roll or spool of media is supplied initially on a tube or cylinder 39. The support of the media spool 38 is rigidified by a bossed portion 44 of the casting. The media can be a roll of paper, plastic, or tear off labels on an underlying sheet.

The media support rod 36 allows for the media to be transported by being pulled by and driven over a cylindrical platen 48. The platen 48 can be a hard rigid elastomeric roller member which rotates and is driven by a drive mechanism within the casing. As the platen 48 rotates it pulls the media in the form of a media strip 52 in a manner so that it is supported under tension with a pivotal foot 54.

These labels can be seen as the end printed product 60 moving outwardly away from the platen 48 after printing. In order to retract the underlying portion of the media 52 after the labels 60 have been removed therefrom, the remaining media underlying the labels 60 is coiled around a spindle 64.

In order to make an imprint upon the media 52, a thermal head 74 is provided. The thermal head 74 has a number of heating elements that provide a multiplicity of dots per inch across its width. These dots provide dot matrix printing by heating the print ribbon. The printing head is supported on a support 76 and extends backwardly on a bracket 78 attached to a pivotal member and pin 80.

The media spool 38 provides a strip 52 over the platen 48 and under the print head 74. This is in association with a print ribbon, or film 120 delivered from a print ribbon roll or spool 122.

After the print ribbon 120 has passed between the print head 74 and platen 48, it moves upwardly. It is then wound on a take-up roller or spindle 162. The take-up roller or spindle 162 can be seen with a tube of cardboard 164 upon which the print ribbon 120 is wound in the rewound condition.

From the foregoing, it can be seen that a thermal printer 10 of this invention has been generally described for operation with the system and program of the printer application adapter.

The thermal printer 10 is such where it incorporates a controller to control the functions of the thermal printer. The thermal printer controller and the controller for the line printer shown in FIGS. 1 and 2 will be generally referred to as the controller which can also be used with a laser printer. It will be numbered with a like number inasmuch as it is a printer controller. The printer controller is in relation to the thermal printer 10, the line printer 11, a laser printer, or other type of dot matrix printer.

Figure 4:
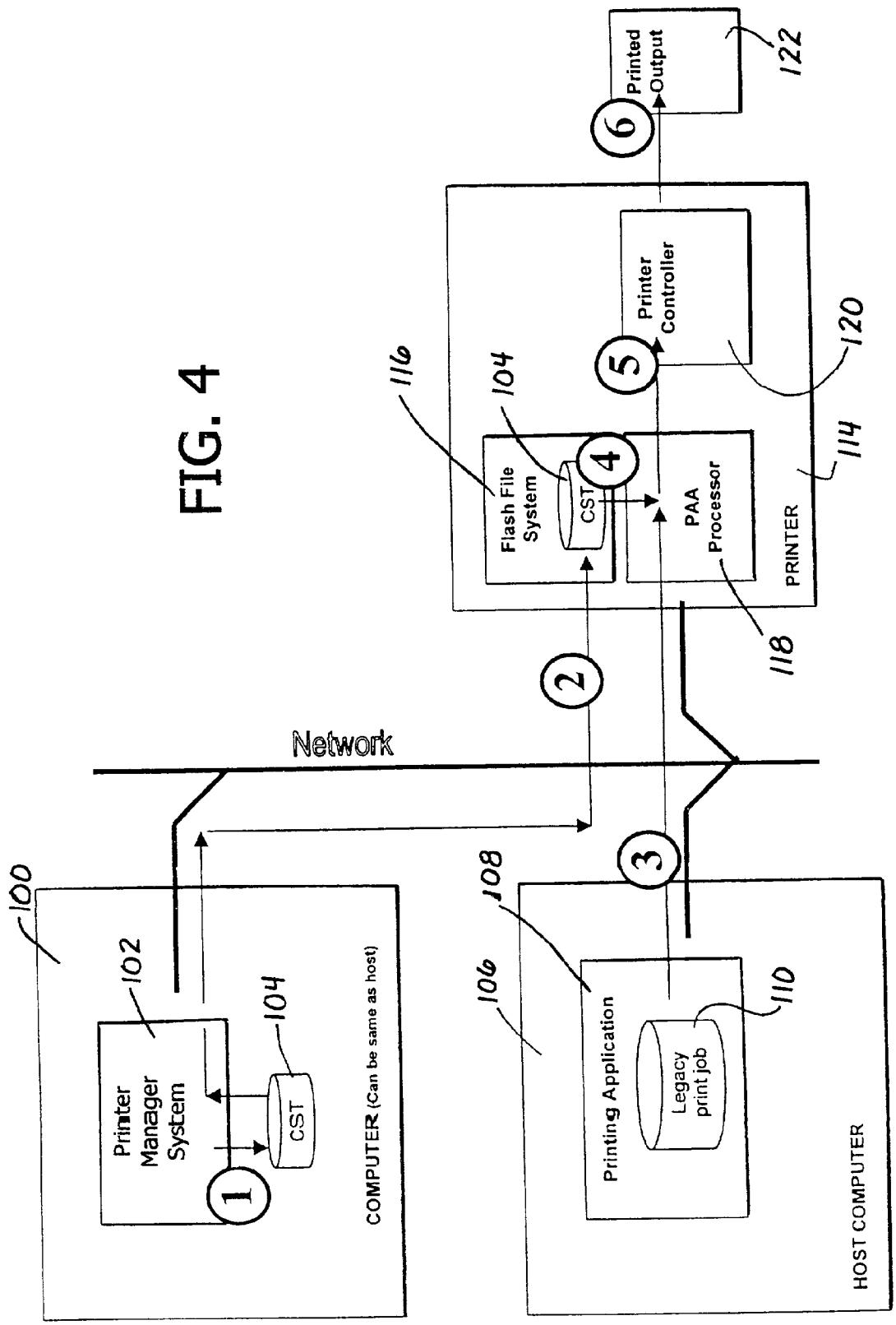
FIG. 4 shows a block diagram of the system utilizing this invention.

Looking more specifically at FIG. 4 and the ancillary figures, it can be seen that a block diagram has been shown.

Block diagram 4 first of all shows a computer block 100. The computer 100 incorporates a printer manager system (PMS) 102. This printer manager system (PMS) 102 can be any program, or other device for managing a printer program or programming or reprogramming it. The printer manager system 102 can be incorporated within a computer 100 which can be the same as a host for the printer.

The computer 100 with the printer manager system which is shown as printer manager system block 102 incorporates the capability of changing or entering into a character or establishing a character substitution table (CST) 104. The character substitution table 104 fundamentally utilizes the concept of substituting specific characters in a prior, alternative, or non-compatible program. This provides a proper printing function for a given printer that would not directly interface with a prior or legacy printing program.

The character substitution table (CST) 104 is established in a manner shown in FIGS. 4, 5, 6 and 7. In these figures, it can be seen that a character substitution takes place by reprogramming a prior, or non-compatible program of a particular printer's application.

The particular printing application is shown on a host computer 106 which incorporates a printing application program 108. The printing application program 108 is that of an established, prior, or ongoing type of printing job which will be referred to hereinafter as a legacy print job, prior printing function, non-compatible program, or a different printer program 110.

The host computer 106 is connected to the printer 114 along with the input from the character substitution table (CST) 104. The character substitution table (CST) 104 has been inserted into a flash file system 116 which can be a non-volatile memory within the printer 114. The printer 114 which is either the thermal printer 10 or the line matrix printer 11 or for that matter any other type of printer (i.e. a laser printer) is labeled as printer 114 which applies to all printers.

Within the printer 114, is a processor which is the printer application adapter (PAA) 118 processor. The printer application processor 118 can be a stand alone processor in the printer 114 or incorporated into the printer's multi-purpose processor.

The PAA 118 when incorporating the CST imparts it to the printer language controller 120 for controlling the printer for a desired or newly established printed output 122. It should be understood that the printer controller 120, printer application adapter (PAA) 118 and the character substitution table (CST) 104 in the flash file system 116 can all be in one particular processor and utilized effectively as the single processor within the printer 114.

As a general explanation, the system and invention hereof allows a user to obtain the print results they desire without having to modify their main printing application or the pre-established native commands of the printer. In other words, the legacy or prior print job 110 program in the printing application program 108 does not have to be significantly modified and can be used for a new printer or a series of new printers. This is particularly helpful when replacing an older printer with a newer printer that is not exactly compatible with the previous printer. Furthermore, it can be helpful where the newer printer's language is different from the printer it is replacing. This sometimes comes about with regard to nuances and variances in programming techniques and functions.

In order to use the invention, the user first examines the data sent from the main printing application 108 when comparing the print results that this data results in on the new or substitute printer 114. The user then determines which commands and aspects of the data need to be changed to effect the correct results.

After determining the data stream changes that are desired, the user must create a CST 104. This is done by using the CST editor in the printer manager system (PMS) 102. The PMS 102 can be any particular program which can edit and allow a change over of a particular printer 114 of the particular type which it is systemized to. The editor of the printer manager system 102 allows a user to enter what they are looking for in the data stream and what they want to do once it is found. For example, items in the prior or legacy print job 110 program that are found can be replaced with something else. They can be deleted, they can mark the beginning of an area to be deleted, or other numerous actions as can be understood with regard to a computer programming function and the desired output.

The CST 104 allows for many entries to be provided for thereby accommodating multiple items to be searched and acted upon that are to be changed in order to characterize the legacy print job system 110 for use with the new or different printer 114.

Once the CST 104 has been created, it must then be sent to the target printer 114. Of course, the target printer 114 can be such where downloads can take place to multiple printers connected to other host computers having similar legacy, prior programmed or incompatible programmed print jobs 110. By using the remote file download feature of a (PMS) 102 which can be accommodated on any network including an internet relationship, the file can be sent to the printer 114 and the printer then stores the file in its non-volatile memory 116.

A user then inputs that the printer 114 should be alerted as to the PAA 118 and to use the newly stored CST 104. This step can be done locally through the printer's control panel such as control panel 17 of the printer 11. It can also be done remotely through the PMS 102 that can be part of any particular computer, including the host computer 106 for the printer 114.

Once the PAA 118 has been activated, it will begin getting all data bytes sent to the printer 114 before the main language processor. It examines each character or string of characters and looks for matches with any entries in the CST 104. If nothing is found, the PAA 118 passes the data along to the main language processor without any modifications and thus the controller 120 is provided with sufficient input to create the desired output using the legacy print job 110.

If a match is found with some entry in the CST 104, the PAA 118 does not forward the matching data on to the main language processor. Instead, it looks at the specified action defined in the CST 104. For example if the action is to replace, an item, the PAA 118 will discard the data that matched and replace it with the new data defined in the CST 104. This new data will now be passed on to the main language processor. In this manner the data has been transformed to achieve the desired print result from the legacy printer or print job 110 without modifying what the main printing application sent was and what commands the main language processor understands.

Returning to FIG. 4, it can be seen that the system diagram shows the basis wherein the (PMS) 102 is utilized to create the CST 104. Thereafter, the PMS 102 stores the CST 104 and then imparts it to the printer flash file system or non-volatile memory 116.

The data is then sent unmodified from the printing application 108. The PAA 118 reads the substitution rules or changes from the CST 104 stored in the flash file system or non-volatile memory 116. At this point, the data stream is modified and forwarded on to the printer controller 120. The foregoing activity from the printer controller 120, which controls the printer such as printers 10 or 11 produces the desired print result or output shown as printed output 122.

Figure 5:
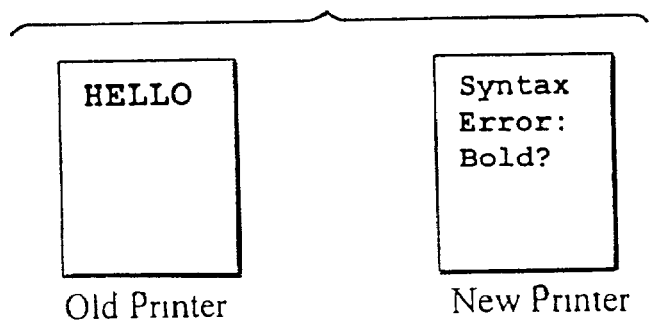
FIG. 5 shows an example of what would happen in a program of a system utilizing a new printer that has not been adapted by the invention hereof.
Figures 6, 7:
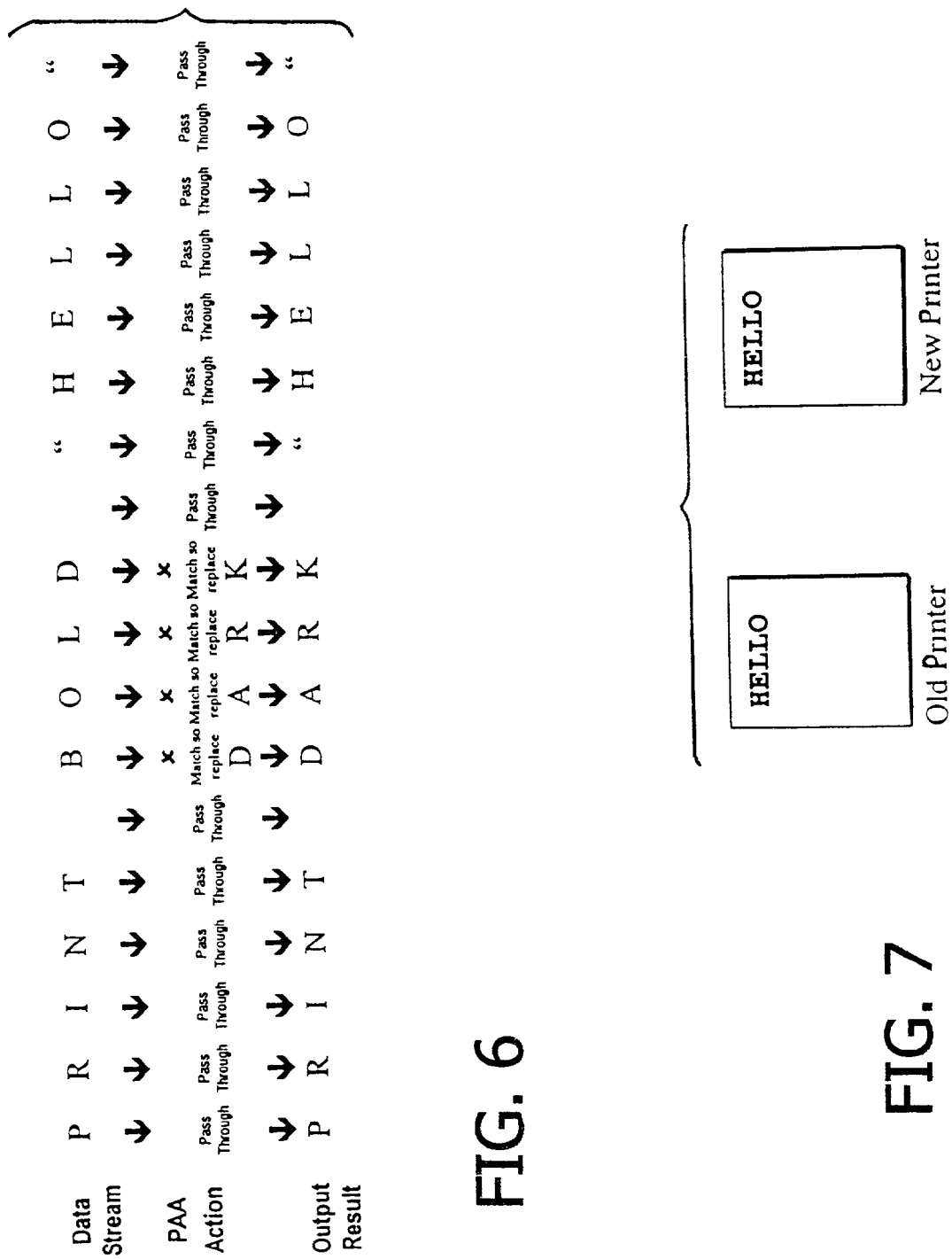
FIG. 6 shows a simple illustration of a diagram of a method for modifying a program with this invention.
FIG. 7 shows a modified printer output based upon the modified printer program of this invention.

In order to understand a simple example, FIGS. 5, 6 and 7 should be turned to.

In the example it is assumed that an older printer with a particular pre-established or incompatibly programmed print job such as the legacy print job 110 derived from a former program is being replaced that uses the command bold to effect emphasized type face printing. Inasmuch as the newer replacement printer is not exactly the same, there would be language difficulties. The replacement printer's native language does not understand the "bold" command. In the alternative it understands a command for "dark" that yields the same desired result.

Due to the difficulties in modifying complicated programs, it is deemed impractical to change the original data stream of the legacy or incompatible program. Furthermore, it is not possible to modify or change the printer's native language. This invention is used to obtain the desired results without having to modify any software and is shown in the manner set forth below.

Looking at FIGS. 5, 6, and 7, the process is such wherein the data stream is sent to both printers (i.e. compatible prior printer, and new incompatible printer), and the result is observed. As seen in FIG. 5, the data stream sent on the old printer is a "bold" Hello. In the new printer, a syntax error is recorded with regard to the "bold" means. In order to resolve the problem, a CST 104 is created with the following entry, namely find "bold" and replace it with "dark".

The CST 104 is sent to the printer to enable the PAA 118 to use it. Thereafter, the original data stream to the new printer 114 is provided.

The PAA 118 finds no match for the print section of the data stream so it passes the data unmodified to the printer language controller 120. The PAA 118 finds a match with the word "bold" and performs a specified action which in this case is replacement by the "dark" command. Hence, the data dark is sent onto the printer language controller.

Finally, no match is found with Hello and so the PAA 118 passes this data unmodified to the printer language controller 120. The net result of the PAA 118 is to create the data stream print "dark" Hello as detailed in the diagram in the showing of FIG. 6.

The final result with the use of the PAA 118 now yields the results that are the same as shown in FIG. 7 with both the older printer with the legacy printer program 110 and the new printer.

Figure 8:
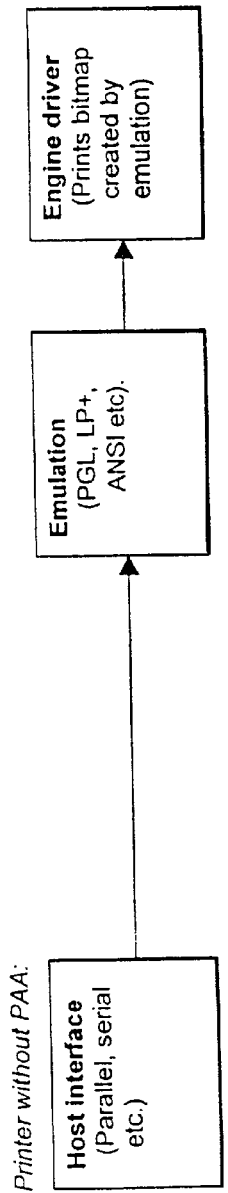
FIG. 8 shows a block diagram of the prior art of a printer without the printer application adapter of this invention.
Figure 9:
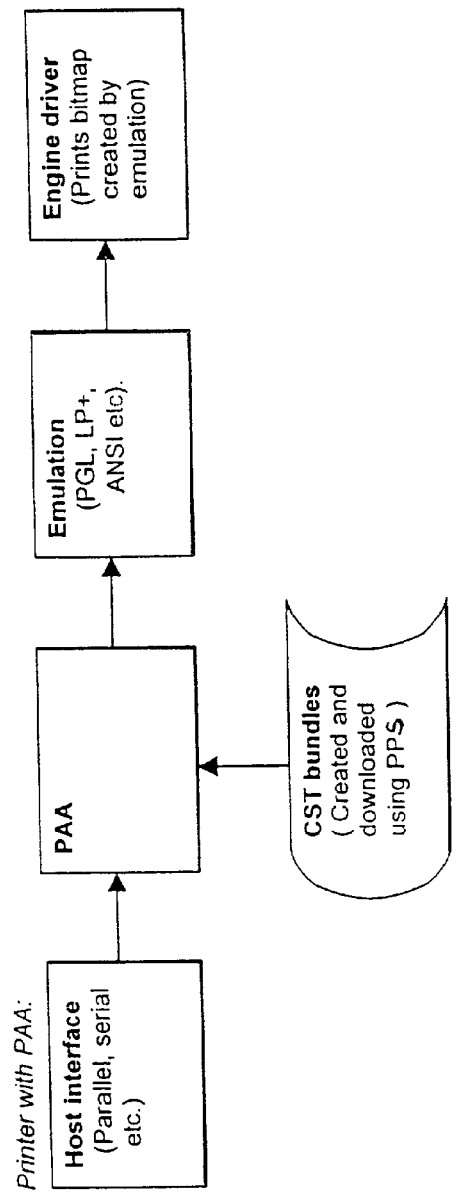
FIG. 9 shows a block diagram of a printer application adapter utilizing this invention.

FIG. 8 shows a printer without the PAA 118. FIG. 9 shows a printer with the PAA 118. Looking more specifically at FIGS. 8 and 9, it can be seen that the PAA 118 module that is inserted into the printer system architecture is done to a code at a location where the emulation that processes the host data receives the data from the host interface driver. All data passes this location independent of the active interface (parallel, serial, etc.).

The CST bundle 104 configures the PAA 118 module in the processor. The bundles are created and downloaded to the printer using a tool in the form of the PMS 102. At this point, the CST 104 is stored in the printer's flash file system or non-volatile memory 116.

Thereafter, the PAA module 118 in the program is used to adapt the printer 114 to a host application or the specific legacy print job 110. This is achieved by modifying the data (sent by the host application to the printer) so that the printer emulation correctly interprets the host data and prints the expected output.

From the foregoing, it can be seen that this invention incorporates a broad spectrum of the ability to use a prior or legacy print job 110 with new printers or systems of printers and plural printers in various networks.

The invention claimed is:

1. A printer system for modifying printer output comprising:
    a printer;
    a program for said printer which has a portion thereof that is not compatible with said printer;
    a managing program for modifying said program;
    a dynamically user-created character substitution table for substituting a portion of said program that is not compatible with said printer, wherein the program can include both printable characters and print commands and wherein the characters and print commands from a data stream to the printer can be directly modified by the user; and,
    a processor in said printer for receiving said character substitution table and modifying said program.

2. The printer system as claimed in claim 1 wherein:
    said program constitutes a printing program for a different printer.

3. The printer system as claimed in claim 2 wherein:
    said printer incorporates different commands from said different printer.

4. The printer system as claimed in claim 3 further comprising:
    a non-volatile memory in said printer into which said character substitution table can be stored.

5. The printer system as claimed in claim 4 further comprising:
    said non-volatile memory is part of said processor in said printer.

6. The printer system as claimed in claim 5 further comprising:
    a printer controller; and,
    said processor provides modified information to said controller based upon the modification by said character substitution table.

7. The printer system as claimed in claim 1 wherein:
    said non-compatible program is stored in a host in communication with said printer.

8. A printer in combination with a host for providing printing instructions to said printer comprising:
    a printer having a processor connected to said host;
    a program of said host that is at least partially incompatible with said printer for providing an output from said printer;
    a system for providing compatible program language to said printer based upon a dynamically user-created character substitution table for substituting characters of said host to create compatibility with said printer; and,
    a file system in said printer for filing substituted characters connected to said processor for incorporation into said program of said host, wherein the file system can include both printable characters and print commands and wherein the characters and print commands from a data stream to the printer can be directly modified by the user.

9. The combination as claimed in claim 8 wherein:
    said printer is a line matrix printer.

10. The combination as claimed in claim 8 wherein:
    said printer is a thermal printer.

11. The combination as claimed in claim 8 wherein:
    said program of said host is for a differently programmed printer from said printer.

12. The combination as claimed in claim 8 wherein:
    said file system is a non-volatile memory within said printer.

13. The combination as claimed in claim 12 wherein:
    said non-volatile memory is a portion of said printer processor.

14. A system in combination with a printer for modifying a non-compatible program for use by said printer comprising:
    a printer having a processor and a flash file;
    a program which is in part non-compatible with said printer;
    a managing program for a user to create a character substitution table for substituting characters of said non-compatible program; and,
    a program in said printer for adapting to non-compatible program to said printer by inserting the character from said character substitution table in said non-compatible program, wherein the character substitution table can include both printable characters and print commands and wherein the characters and print commands from a data stream to the printer can be directly modified by the user.

15. The combination as claimed in claim 14 wherein:
    said printer is a thermal printer.

16. The combination as claimed in claim 14 wherein:
said printer is a line matrix printer.

17. The combination as claimed in claim 14 further comprising:
said processor includes a non-volatile memory for said flash file.

18. The combination as claimed in claim 14 further comprising:
a host computer connected to said printer having said non-compatible program.

19. A method of printing with a non-compatible printer program comprising:
providing a printer;
providing a program which is not compatible with said printer;
creating a user-changeable character substitution table to substitute characters from said non-compatible program with characters compatible with said printer, wherein the program can include both printable characters and print commands and wherein the characters and print commands from a data stream to the printer can be directly modified by the user;
storing said character substitution table in said printer; and,
processing the stored characters of said character substitution table to adapt them to said printer with said non-compatible program.

20. The method as claimed in claim 19 further comprising:
printing said non-compatible program with the substituted characters in a thermal printer.

21. The method as claimed in claim 19 further comprising:
printing said non-compatible program with the substituted characters in a line matrix printer.

22. The method as claimed in claim 20 further comprising:
storing said character substitution table in a non-volatile memory portion of the printer's processor.

23. The method as claimed in claim 19 further comprising:
providing said non-compatible program in a host computer which was programmed for use with a different printer from said printer.

\* \* \* \* \*